United States Patent [19]

Bricker

[11] 4,201,563
[45] May 6, 1980

[54] POSITION SELECTABLE GLASS SURFACE TEMPERATURE SCANNER

[75] Inventor: Jack A. Bricker, Tarentum, Pa.

[73] Assignee: PPG Industries, Inc., Pittsburgh, Pa.

[21] Appl. No.: 912,666

[22] Filed: Jun. 5, 1978

[51] Int. Cl.² ............................................. C03B 29/04
[52] U.S. Cl. ............................................ 65/162; 65/29; 65/104
[58] Field of Search ............................ 65/29, 104, 162

[56] References Cited

U.S. PATENT DOCUMENTS

| 3,257,188 | 6/1966 | Morgan et al. | 65/29 X |
| 3,479,172 | 11/1969 | McCown et al. | 65/158 |
| 3,744,985 | 7/1973 | Peternel | 65/104 |
| 3,819,347 | 6/1974 | Callies et al. | 65/29 |
| 3,849,099 | 11/1974 | Maltey, Jr. et al. | 65/29 X |
| 4,043,780 | 8/1977 | Bricker et al. | 65/29 |

Primary Examiner—Arthur D. Kellogg
Attorney, Agent, or Firm—Paul A. Leipold

[57] ABSTRACT

An apparatus and method for tempering glass is described. Glass sheets are passed through a tempering furnace along a predetermined generally horizontal path. The temperature of the sheets is measured by a pivoting pyrometer above the sheets and the furnace is regulated to achieve a zero temperature profile across the plates.

6 Claims, 5 Drawing Figures

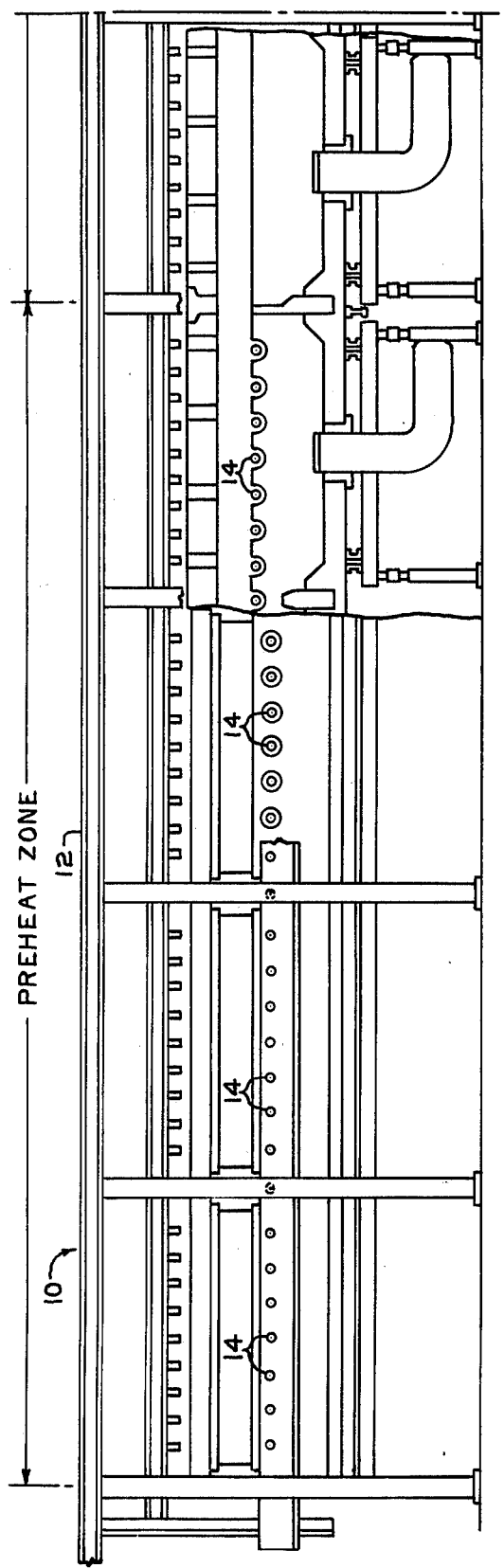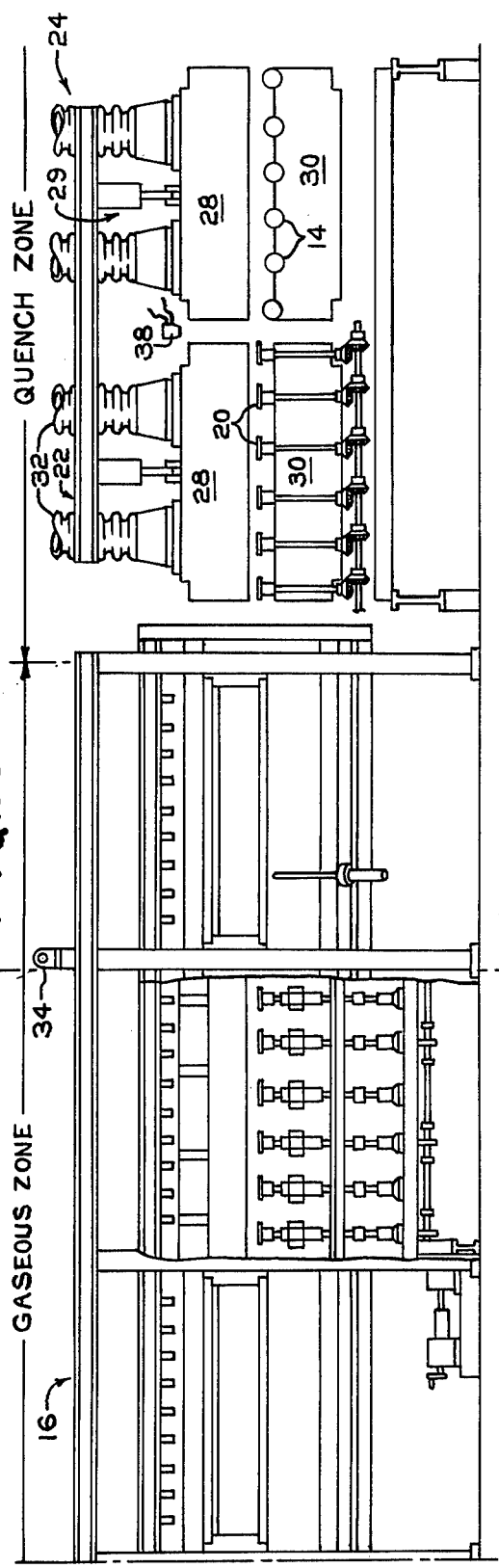

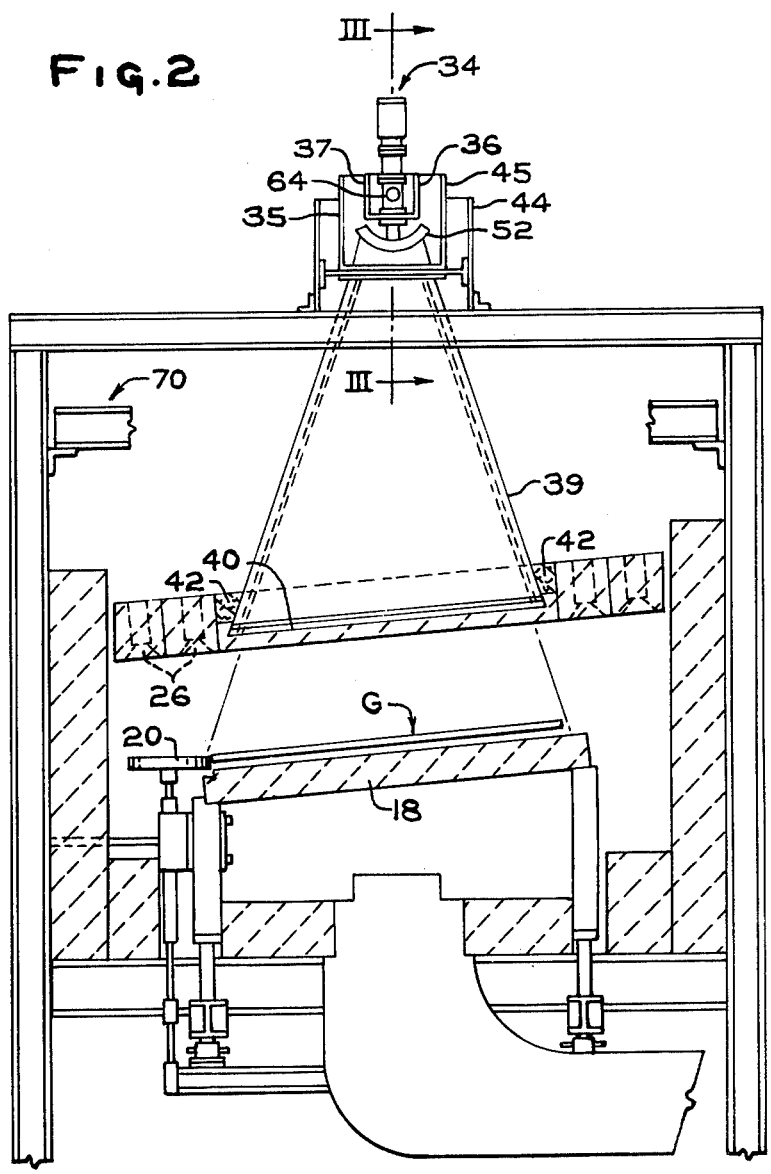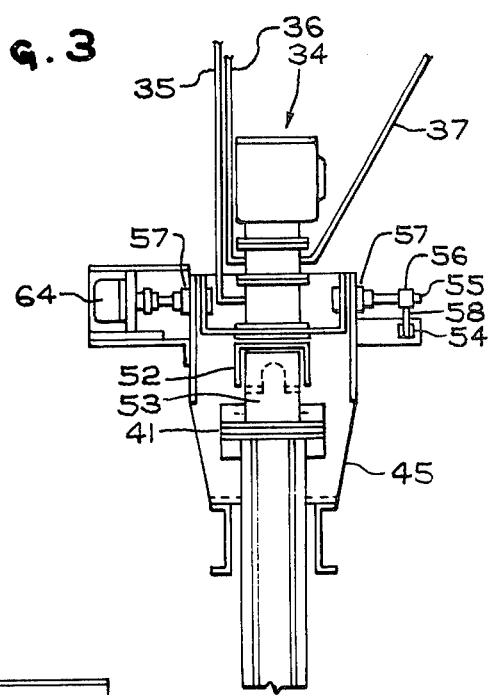

POSITION SELECTABLE GLASS SURFACE TEMPERATURE SCANNER

BACKGROUND OF THE INVENTION

1. Field of the Invention

Glass sheets are tempered by a process involving heating glass sheets above the strain point and approaching the softening point of the glass and then substantially cooling the heated glass sheets. Typical apparatus for tempering glass sheets comprises a tunnel-type heating furnace followed by a cooling station disposed in end-to-end relation with said furnace.

When glass sheets are tempered or heat strengthened, it is necessary to heat the glass sheets to a temperature above that at which the contour is changed by a deformation stress on contact with solid members. Where it is desired to strengthen glass sheets, it is further necessary to rapidly cool the glass sheets from such a deformation temperature to a lower temperature below the annealing range of the glass. The effectiveness of such strengthening is improved by an improvement in the control of the temperature to which the glass sheets are heated before they are rapidly chilled. This includes controlling the relative temperature of the top and bottom glass surfaces and the temperature profile across the dimension of the sheet transverse to its path of movement through the heating furnace and cooling station.

Glass is known to be strong in compression and weak in tension. Tempering glass increases the compression stress at the surface, thus increasing the resistance of tempered glass to fracture on impact compared to untempered glass. Furthermore, in the less frequent times that tempered glass fractures on impact, it forms smaller fragments that are less harmful than the relatively large fragments with jagged edges that result when untempered glass is broken.

There are three well-known systems for handling glass sheets during tempering. In one of these systems, glass sheets are suspended by one or more sets of tongs in a vertical disposition during their conveyance through a heating furnace and a cooling station. The tongs tend to penetrate the heat-softened glass and impart poor optical properties in the vicinity of the tong support areas.

Glass sheets are also handled by conveyance on spaced, rotating rollers disposed with their peripheral surfaces forming a horizontal path for transporting glass sheets through an elongated heating furnace and a cooling station. The need to space the rollers from one another to permit radiant energy to impinge on the lower glass surface causes the glass to sag and develop an optical defect. This defect has resulted in a desire to develop a technique for handling glass sheets in which their engagement by solid members which tend to distort the glass with its heat-softened properties is at a minimum. Such a technique is the so-called gas hearth method in which glass sheets, at least during the portion of the heating and cooling cycle when they are sufficiently hot to distort readily when their major surface contacts a solid member, are supported on a gaseous bed and engaged along a side edge only so as to minimize the portion of the glass sheet surface that engages a solid member during the critical portion of its thermal treatment when the glass is most liable to distortion.

When glass sheets are tempered on the gas hearth, if their upper and lower surfaces are heated to different temperatures, the glass tends to warp. If the glass warps into a configuration that is concave in elevation in a direction transverse to the path of glass movement, the lower central portion of the glass comes into engagement with the upper surface of the apertured bed which supplies hot gas for supporting the glass sheet during its thermal treatment, thereby developing surface scratches that develop into optical defects. If the concave warp is sufficiently severe, the glass will stick on the hearth bed and stop the flow of glass sheets through the furnace.

In a typical gas hearth operation, the glass is supported in a transversely oblique plane oriented approximately 5° from the horizontal in a direction transverse to the direction of glass sheet movement and rotating discs are provided to engage the lower edge of the glass to propel the glass sheets by friction in a forward direction through the critical portion of the conveyor. The temperature profile of the glass sheets transverse to their path of movement along the gas hearth is very important. The temperature must be substantially uniform, although the edge portion engaged by the rotating discs that propel the glass sheets forward through the gas hearth heating furnace may be at a slightly lower temperature such that the engaged edge is not unduly distorted by contact with the rotating driving discs.

DESCRIPTION OF THE PRIOR ART

A typical gas hearth operation for which the present invention is especially adapted is disclosed in U.S. Pat. No. 3,223,501 to Fredley and Sleighter. However, it is understood that the present invention is also adapted for use with a roller hearth type of operation such as disclosed in U.S. Pat. No. 3,245,772 to Cypher and Davidson. In the past, the temperature of conveyed glass sheets has been monitored as they pass one or more fixed points along the conveyor where the glass temperature is continuously or intermittently measured.

U.S. Pat. No. 3,479,172 to McCown, Maltby and Allen discloses a glass sheet temperature assembly which includes a radiation sensing device mounted for movement in a reciprocal path between sidewalls of a lehr in position to detect the temperature of the lower surface of a ribbon.

U.S. Pat. No. 3,744,985 to Peternel discloses a temperature sensing mechanism for measuring the temperature of different portions of successive glass sheets according to a repetitive cycle as glass sheets supported by tongs leave a furnace en route to an additional treatment station.

U.S. Pat. No. 3,819,347 to Callies, Irlind, Retzloff and Zellers discloses a scanning pyrometer used to control the temperature and thickness of a glass sheet.

U.S. Pat. No. 3,849,099 to Maltby and O'Connell discloses a system for measuring a temperature profile across a glass ribbon comprising a pyrometer mounted on a carriage for reciprocating movement transverse to the path of glass ribbon movement in a plane above the plane of support for the glass.

U.S. Pat. No. 4,043,780 to Bricker et al discloses a process for measuring the temperature of plate glass in a tempering furnace along the direction transverse to the direction of movement of the glass through the furnace. The system of Bricker et al utilizes a series of sight tubes in the roof of the furnace over which a radiation pyrometer is passed and readings are taken by opening the sight tubes and positioning the pyrometer over each tube as it is opened in turn. The system of Bricker et al, while useful, possesses several drawbacks including the necessity of expensive custom installation of the sight tubes that requires drilling of the refractory brick and mounting and alignment of the drilled brick in a position so as to allow the sight tubes to be focused on a particular section of the glass. Further, Bricker et al require extensive hardware for the mounting of the bridge, motor movement of the pyrometer and the apparatus necessary to open the sight tubes. Additionally, the apparatus of Bricker et al normally is only able to read one point per plate or be continuously stationed at one point on the plate and read several points along the surface passing underneath the sight tube.

SUMMARY OF THE INVENTION

It is an object of this invention to overcome the disadvantages of the prior art.

It is a further object of this invention to prevent side-to-side warpage of glass in a tempering furnace.

It is an additional object of this invention to achieve close to a zero differential in temperature between points of a glass plate moving through a tempering furnace.

It is a further additional object to provide more uniform temper to glass plates.

It is an additional object to provide flatter plate glass as it travels through a tempering furnace.

These and other objects of the invention are generally accomplished by providing in at least one location in the roof of a tempering furnace a pivoting radiation pyrometer that is adapted to sense the temperature transverse to the direction of travel of each glass plate or a series of glass plates. Then, either by automation or hand-control, the tempering furnace is adjusted to achieve a flat temperature profile that will bring about flattened glass during the movement through the furnace and also a uniform temper of the final glass product.

The system of the instant invention achieves several advantages over temperature sensing and adjustment systems of the prior art. Prior to the instant system, it was widely accepted that the temperature regulation of a tempering furnace required control of the top temperature of the glass within a certain range for the type of glass. With the instant system measuring only at the top surface of the glass, surprisingly it has been found that a most important feature of good operation of a tempering furnace to provide glass for a quenching system is a close to zero difference of the temperature of the upper glass surface over a direction transverse to the travel of the glass through the furnace. Control of side-to-side upper surface temperature variation to close to zero on glass plates in the furnace has been found to give better more uniform temper after quench and also improve the optical qualities of the tempered glass. The temperature which is maintained evenly across the glass of course must be a temperature within the tempering range for the particular glass. Further, an advantage is that because the glass has a zero temperature profile transverse to the direction of the furnace the glass remains flatter in the furnace and this allows the use of reduced airflow underneath the glass and leads to less "picture framing effect" caused by higher lifting of the glass, by increased airflow, so that the corners sag.

An additional advantage of the instant system is that it allows measurements of a variety of points and types to be performed on the glass plate as it passes through the furnace. A pivoting radiation pyrometer may be sighted on any point and continuously read that point or the pyrometer may be set to scan an individual plate and read the result of that plate in a temperature profile or as preferred the radiation pyrometer may be positioned to scan across each plate and read four or five set points and then display the average reading at each set point for the series of plates. A further advantage of the instant system is it allows a saving in cost over the prior art systems such as Bricker et al and Maltby et al which required a traversing system to move the pyrometer from one point to another and a complicated method of access to the furnace for the pyrometer readings.

A specific embodiment of the present invention has been developed for use in combination with a gas hearth furnace and quench of the type depicted in U.S. Pat. No. 3,223,501, Fredley et al, comprises a pivoting radiation pyrometer mounted between the seventh and eighth sections of the furnace and adapted to scan transversely across each plate of glass and read five generally evenly spaced points. The radiation pyrometer preferably is mounted permanently in a closed structure above the furnace such that heat loss is minimal and the entire surface of any glass plate within the furnace may be scanned. The controls for the radiation pyrometer in this embodiment are adjusted to read five values corresponding to the five evenly spaced points which are read. Each of these values is the average of the sweeps of four different plates. The operation of the furnace is adjusted in order to attain as close as possible to a zero differential between the five points which are read transversely across the glass plates. Maintaining a zero differential between the points has resulted in improved operation of the furnace and a better tempered glass product.

BRIEF DESCRIPTION OF THE DRAWINGS

FIG. 1a is a side elevation view of the preheat zone of the apparatus for tempering glass sheets with portions of the apparatus removed;

FIG. 1b is a side elevational view of the gaseous and quench zones of the apparatus for tempering glass sheets with portions of the apparatus in both the gaseous and quench zones removed.

FIG. 2 is a fragmentary cross-sectional view taken along lines II—II of FIG. 1.

FIG. 3 represents a cross-sectional view along lines III—III of FIG. 2 showing a cross-sectional view of the scanner operating mechanism and structure which houses it over the top of the furnace.

DESCRIPTION OF THE PREFERRED EMBODIMENTS

Figure 4:
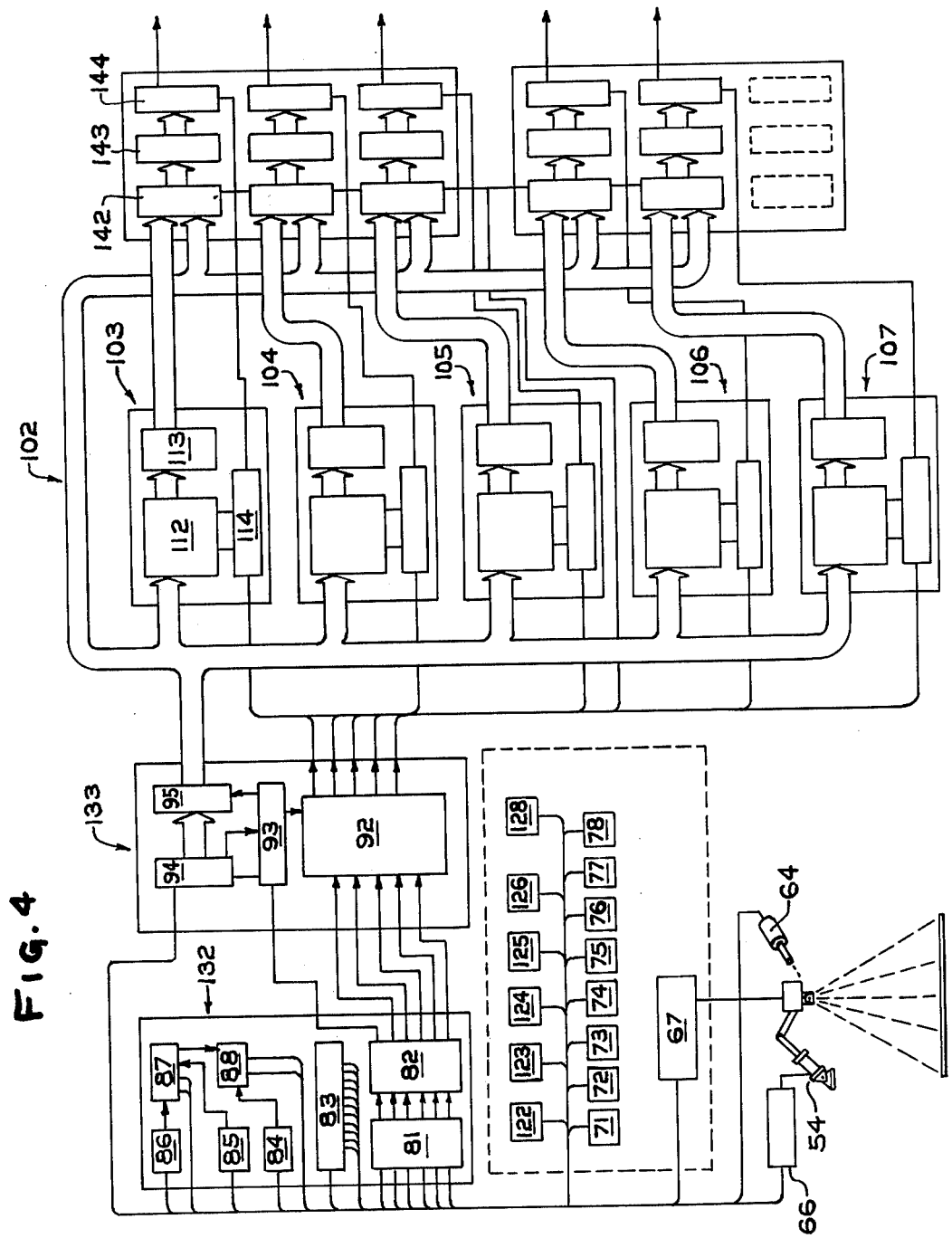
FIG. 4 is a block diagram of circuitory for control of the scanner mechanism.

Referring to the drawings, a tunnel-type heating furnace 10 is provided for transporting glass sheets lengthwise thereof. The glass sheets are conveyed through a preheat zone 12 on longitudinally spaced, transversely extending conveyor rolls 14 shown at different elevations in different portions of the furnace 10. The conveyor continues through a gaseous zone 16 which includes a gas hearth 18 (see FIG. 2) having an obliquely-disposed, upper bed through which hot gaseous products are provided to support glass sheets on a film of gas at an oblique angle parallel to the upper surface of the gas hearth 18 with driving discs 20 disposed to engage the lower longitudinal side edge of glass sheets G for conveyance beyond the preheat zone 12. Additional driving discs 20 are provided in a first quench zone 22, which is followed by additional quench zones 24. Since the glass sheet surfaces are sufficiently cool when they arrive at this position to have little likelihood for damage, conveyor rolls 14 are longitudinally spaced to provide spaced rotating supports in zones 24. The terms "sheet" and "plate" are herein used interchangeably to refer to the glass treated in the system of the invention.

In the furnace, a series of heating elements 26, each of which has its output individually controlled, provides a pattern of heat radiated downward on the upper surface of the glass sheets G transported through the furnace 10. A mixture of air and gas is provided for the gas hearth 18 to heat the lower surface of the glass sheets as the latter are conveyed through the furnace 10.

The furnace is of the type of gas hearth furnace similar to that disclosed in U.S. Pat. No. 3,223,501 to James C. Fredley and George E. Sleighter, except for the fact that gas burners are provided as radiant heat sources rather than electrical heaters. However, the details of the furnace insofar as it relates to the gas hearth structure thereof is only by way of providing background for the present invention, as the present invention may be used in conjunction with other heating furnaces besides the gas hearth furnace disclosed in the drawings of the present application. For example, so-called roller hearth furnaces in which the glass is conveyed throughout the entire furnace length on rollers instead of being supported in the hottest portion thereof on a gaseous hearth 18 may also be modified in accordance with the present invention.

The glass sheets that are handled according to the present invention are first heated while conveyed through the furnace 10 and then chilled rapidly in the first quench zone 22 to impart at least a partial temper thereto. In order to cool the glass, each of the quench zones 22 and 24 has an upper plenum chamber 28 pivotally supported by pivotal support means 29 and a lower plenum chamber 30. Flexible tempering fluid supply conduits 32 supply tempering fluid (usually air) under pressure into the upper and lower plenum chambers 28 and 30 through the flexible conduits 32 from the pressure sources (not shown). Only the tempering fluid system for the upper plenum chambers 28 is partially disclosed. It is appreciated that similar construction is available to supply tempering fluid to the lower plenum chambers 30.

In a preferred form of the present invention the furnace is provided with a top surface pyrometer 34 disposed above the gaseous zone 16 of the furnace 10 such that it may scan a glass plate as wide as the capacity of the furnace or alternatively may be adjusted to scan plates of narrower than maximum width. A preferred location for the scanning pyrometer of the instant invention is between the seventh and eighth zones of the furnace, one zone from the exit. The pyrometer is carried by a housing 45 which is supported by members 41 and 44 bolted to the frame of the furnace. The housing 45 is connected to the triangular section 39 which provides access for the scanning pyrometer to the furnace. The trunkated pyramidal section 39 is supported by horizontal member 41, FIG. 2, affixed to member 44. Its lower edges rest adjacent to but not in contact with a refractory lip 40 in the furnace top. Insulating material 42 is then packed around the pyramidal 39 lower surface and the refractory lip 40 to provide a heat seal. The radiation pyrometer is arranged to pivot on pivot points 57 such that it may scan the plates of glass as they pass beneath. The pyrometer is pivoted in a track 53 which provides a seal to prevent escape of furnace gases. The pyrometer housing is preferably kept below 120° F. by cooling inlet and outlet pipes 36 and 37, respectively. The face of the pyrometer is protected from furnace gases by a positive pressure of air entering at inlet pipe 35.

As illustrated in FIG. 3 which is a cross-sectional view along line III—III of FIG. 2 showing a cross-sectional view of the scanner operating mechanism, radiation pyrometer 34 supported by housing 45 pivots on points 57. The pivoting is controlled by a pneumatic air cylinder 54 operating to move arm 58. The encoder 64 reads the angular position of the pyrometer. The pyrometer is operating within channel 52 and furnace gases escape is inhibited by sealing means 53 which is slideably in contact with channel 52.

Referring to FIG. 4 which is a representative diagram of the circuitry for a preferred control system in accordance with the invention, it may be seen that the system is established to either read an average of four plates at each of five reading positions or it may be regulated to not average and thereby to provide a reading of each plate at five positions. In FIG. 4 the pyrometer 34 is made to oscillate by the pneumatic cylinder control 54 to read five points on glass plate 65. Each of the reading points is represented in the illustration by a dotted line reading to the plate. The encoder 64 is adapted to read the angular position of the pyrometer as it scans the glass. The control panel has five control positions which allow adjustment of the five points which are read on the glass plate. These positions are indicated as 122, 123, 124, 125 and 126 on the drawing. The readings at any or all of the five set points may be controlled by points 71, 72, 73, 74 and 75. Control 76 allows the operator to read either the average of four readings for four plates at each point or directly read each plate. Clock control 77 in cooperation with the leading edge delay control 128 allows the operator to determine at which point from the leading edge on each plate the temperature readings should be taken. The section indicated generally as 132 is the control mechanism which performs the functions previously set out as being possible to perform by the controls on the panel 68. The plate detector 86, leading edge delay control 87, start 85, scan start 88, system reset 84, encoder count storage 83, position read control 81 and initiate position read 82 comprise the control panel mechanism. The control section indicated generally as 133 controls the conversion of the data from analogue to digital form and contains analogue/digital converter 94, output register 95, time and control 93 and position storage control 92.

A 10 bit data buss for direct output is generally indicated at 102. Indicated at 103, 104, 105, 106, 107 are the controls for averaging the four readings of the scanning pyrometer. Each control contains a four plate storage register 112, four plate averaging 113, and plate counting control 114. Each of the ten bit data buss units feeds information to an output which produces a graph printout of the temperature sensed either directly or as the average of 4 scans. These analogue output controls, each contain a multiplexer for average or direct reading 142, a ten bit output register 143 and a digital/analogue converter 144.

As can be seen this control system allows the operator to select any five points of the glass moving through the furnace and reach each point or an average of 4 plates at each of the five points. Further, the five points may be controlled as to their location on each plate from the leading edge.

While the invention and control circuits have been described with a readout of the temperature at five distinct points on the plates, it is of course possible that the output could be used with automatic control mechanisms to regulate the heating means for the glass in the furnace in response to sensed deviations from a zero profile temperature. The preferred embodiment while described for use with a furnace that has manual controls is not meant to be limited to only manually controlled furnaces but encompass the use of the invention with automatic controls of the heating within the furnace in response to sensed deviations from a zero profile temperature of a glass plate. Further it is clear that the controls could be modified to read greater than or fewer than five top points if such was necessary to achieve the desired glass improvement in a particular application. Additionally, more than one scanner could be installed in order to allow closer monitoring of the glass. In some instances, several scans of the same plate may be made in order to compare leading middle and trailing positions.

The top surface pyrometer 34 is operated in a wave band 4.8 to 5.2 microns, preferably. In this wave band, the portion of the sprectral band where effects of absorption by carbon monoxide, water and carbon dioxide is at a minimum. Furthermore, the wave band is selected because soda-lime-silica glass of the float glass type is transparent to energy in this band to a depth of only about 0.040 inch (approximately 1 millimeter). Since the glass sheets normally processed have thicknesses greater than 2 millimeters, the surface pyrometer 34 is capable of measuring the top surface temperature without any significant effect from the bottom surface temperature.

While this invention has been disclosed and described with reference to specific embodiments, it should not be construed to be limited by this description. The specific description is intended to point out the preferred embodiments of the invention and to disclose the best modes of carrying out this invention. Those skilled in the art of glass manufacture will realize that the principles of this invention may be utilized in other processes and may be used in combination with other developments while taking advantage of the particular utility derived from the practice of this invention itself. For instance, the pyrometer system of the instant invention could be utilized to read the temperatures in a roller hearth tempering furnace or in a tempering furnace where tongs hold the glass during heating.

I claim:

1. Apparatus for heating a series of glass sheets moving along a longitudinal path and monitoring and regulating the temperature thereof at a plurality of positions spaced from one another and aligned in a direction transverse to the direction of movement of said sheets so as to regulate the temperature at each of said positions to provide an average temperature at each of said positions substantially the same and produce a substantially zero temperature profile across said sheets, said apparatus comprising:

a furnace enclosure formed by refractory walls, means for conveying a series of glass sheets along a longitudinal path through the furnace with the glass sheets supported in a generally horizontal orientation, radiant heating means for supplying heat to said sheets, means for regulating the heat applied to said sheets by said radiant heating means and quenching means designed to temper the heated glass sheets leaving the furnace, said heat regulating means comprising;

a narrow chamber positioned in said furnace above said moving glass sheets, said chamber having an opening in the lower-most edge thereof extending transversely with respect to the path of movement of said glass sheets, said chamber being formed by closely-space sidewalls and converging end walls which extend through the top of the furnace to a location thereabove and terminate in an opening in the uppermost end of said chamber;

a closed housing mounted over said opening in the upper end of said chamber, a scanning radiation pyrometer pivotally mounted in said closed housing, means for oscillating said pivotally mounted pyrometer in a direction transverse to the direction of movement of said sheets, means to record the pyrometer temperature readings at a plurality of spaced positions as said pyrometer oscilates in a direction transverse to the direction of movement of said sheets, means to regulate said heating means to maintain the temperature at each of the points scanned substantially the same so as to produce substantially a zero temperature profile across said sheets, and means for introducing air at a positive pressure into said housing and said chamber sufficient to prevent the flow of furnace gas from said furnace enclosure into said chamber and said housing.

2. The apparatus of claim 1 further comprising means to display the average temperature at each position of temperature sensing.

3. The apparatus of claim 1 wherein the scanning of the pyrometer in seal means does not permit escape of furnace gases.

4. Apparatus for temperature sensing in a furnace comprising a narrow chamber positioned in said furnace above moving glass sheets, said chamber having an opening in the lower-most edge thereof extending transversely with respect to the path of movement of said glass sheets, said chamber being formed by closely-space sidewalls and converging end walls which extend through the top of the furnace to a location thereabove and terminate in an opening in the uppermost end of said chamber;

a closed housing mounted over said opening in the upper end of said chamber, a scanning radiation pyrometer pivotally mounted in said closed housing, means for oscillating said pivotally mounted pyrometer in a direction transverse to the direction of movement of said sheets, means to record the pyrometer temperature readings at a plurality of spaced positions as said pyrometer oscilates in a direction transverse to the direction of movement of said sheets, means to average the temperature sensed on a plurality of sheets at the same positions, means to display the average temperature at each of said positions, and means for introducing gas at a positive pressure into said housing to prevent the flow of furnace gas from said furnace enclosure to the face of said pyrometer.

5. The apparatus of claim 4 further comprising a seal to prevent escape of furnace gases.

6. The apparatus of claim 4 further comprising pneumatic actuated means exterior of said furnace to pivot said pyrometer.

* * * * *